(12) United States Patent
Cho et al.

(10) Patent No.: US 12,501,013 B2
(45) Date of Patent: Dec. 16, 2025

(54) DISPLAY DEVICE AND A METHOD OF DRIVING THE SAME

(71) Applicant: SAMSUNG DISPLAY CO., LTD., Yongin-si (KR)

(72) Inventors: Hyun Jin Cho, Yongin-si (KR); Beom Shik Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 31 days.

(21) Appl. No.: 18/406,300

(22) Filed: Jan. 8, 2024

(65) Prior Publication Data

US 2024/0323333 A1  Sep. 26, 2024

(30) Foreign Application Priority Data

Mar. 23, 2023 (KR) ........................ 10-2023-0037932

(51) Int. Cl.
*H04N 13/125* (2018.01)
*H04N 13/305* (2018.01)
*H04N 13/31* (2018.01)
*H04N 13/383* (2018.01)

(52) U.S. Cl.
CPC ......... *H04N 13/125* (2018.05); *H04N 13/305* (2018.05); *H04N 13/31* (2018.05); *H04N 13/383* (2018.05)

(58) Field of Classification Search
CPC .... H04N 13/125; H04N 13/305; H04N 13/31; H04N 13/383; H04N 13/327; G09G 3/2074; G02B 30/20
USPC ........................................................ 348/43
See application file for complete search history.

(56) References Cited

U.S. PATENT DOCUMENTS

| | | | |
|---|---|---|---|
| 9,479,767 B2 | 10/2016 | Van Der Horst | |
| 11,051,003 B2 | 6/2021 | Lee et al. | |
| 2003/0025995 A1* | 2/2003 | Redert | H04N 13/368 348/E13.043 |
| 2011/0102423 A1* | 5/2011 | Nam | H04N 13/317 345/419 |
| 2012/0038632 A1* | 2/2012 | Matsunaga | H04N 13/317 345/419 |
| 2012/0257018 A1* | 10/2012 | Shigemura | G02B 30/27 348/46 |

(Continued)

FOREIGN PATENT DOCUMENTS

| | | |
|---|---|---|
| KR | 10-2279277 | 7/2021 |
| KR | 10-2447101 | 9/2022 |

*Primary Examiner* — Tung T Vo
(74) *Attorney, Agent, or Firm* — F. CHAU & ASSOCIATES, LLC (57) ABSTRACT

A display device including: a display panel including subpixels; a viewpoint separation unit configured to separate viewpoint images displayed by the display panel for each viewpoint; and a control unit configured to determine a left eye viewpoint image provided to a left eye viewpoint corresponding to a left eye position of a viewer and a right eye viewpoint image provided to a right eye viewpoint corresponding to a right eye position of the viewer, wherein the control unit converts left eye adjacent viewpoint images provided to viewpoints adjacent to the left eye viewpoint into the left eye viewpoint image, and converts right eye adjacent viewpoint images provided to viewpoints adjacent to the right eye viewpoint into the right eye viewpoint image.

20 Claims, 10 Drawing Sheets (56) References Cited

U.S. PATENT DOCUMENTS

| | | | | |
|---|---|---|---|---|
| 2013/0249896 A1* | 9/2013 | Hamagishi | | H04N 13/354 |
| | | | | 345/204 |
| 2013/0293691 A1* | 11/2013 | Saito | | G09G 3/003 |
| | | | | 348/59 |
| 2014/0071237 A1* | 3/2014 | Ueki | | H04N 13/31 |
| | | | | 348/43 |
| 2014/0146149 A1* | 5/2014 | Wu | | H04N 13/305 |
| | | | | 348/59 |
| 2014/0254008 A1* | 9/2014 | Tanioka | | G02B 30/27 |
| | | | | 359/464 |
| 2015/0015681 A1* | 1/2015 | Kim | | G02B 30/27 |
| | | | | 348/51 |
| 2015/0077526 A1* | 3/2015 | Kim | | H04N 13/349 |
| | | | | 348/51 |
| 2015/0085089 A1* | 3/2015 | Shigemura | | H04N 13/351 |
| | | | | 348/54 |
| 2015/0362740 A1* | 12/2015 | Hamagishi | | H04N 13/366 |
| | | | | 359/462 |
| 2016/0073097 A1* | 3/2016 | Hamagishi | | H04N 13/383 |
| | | | | 348/59 |
| 2016/0080729 A1* | 3/2016 | Watanabe | | H04N 13/225 |
| | | | | 348/54 |
| 2016/0142704 A1* | 5/2016 | Hamagishi | | H04N 13/351 |
| | | | | 348/59 |
| 2016/0154458 A1* | 6/2016 | Liu | | H04N 13/373 |
| | | | | 348/40 |
| 2017/0374356 A1* | 12/2017 | Lu | | H04N 13/398 |
| 2024/0244175 A1* | 7/2024 | Yano | | H04N 13/305 |
| 2024/0323333 A1* | 9/2024 | Cho | | H04N 13/383 |

* cited by examiner

DISPLAY DEVICE AND A METHOD OF DRIVING THE SAME

CROSS-REFERENCE TO RELATED APPLICATION

This application claims priority under 35 U.S.C. § 119 to Korean Patent Application No. 10-2023-0037932 filed on Mar. 23, 2023, the disclosure of which is incorporated by reference herein in its entirety.

1. Technical Field

The present disclosure relates to a display device and a method of driving the same.

2. Discussion of Related Art

With the continuous development of information technology, the significance of a display device, which is a connection medium between a user and information, has been increasingly emphasized. As a result, the utilization of a display device such as a liquid crystal display device and an organic light emitting display device is increasing.

A stereoscopic image display device is designed to create a visual effect that simulates a three-dimensional image. The stereoscopic display device achieves this by stimulating the viewer's visual sense to perceive a real object. One common approach involves providing different images to a left eye and a right eye of the viewer, leveraging the concept of binocular parallax. This technique allows the viewer to perceive a stereoscopic image, as the brain processes the slightly different perspectives from each eye, creating a sense of depth and three-dimensionality.

SUMMARY

Embodiments of the present disclosure are directed to a display device and a method of driving the same, with a focus on enhancing the quality of displayed three-dimensional (3D) images by reducing crosstalk.

According to an embodiment of the present disclosure, there is provided a display device including: a display panel including sub-pixels; a viewpoint separation unit configured to separate viewpoint images displayed by the display panel for each viewpoint; and a control unit configured to determine a left eye viewpoint image provided to a left eye viewpoint corresponding to a left eye position of a viewer and a right eye viewpoint image provided to a right eye viewpoint corresponding to a right eye position of the viewer, wherein the control unit converts left eye adjacent viewpoint images provided to viewpoints adjacent to the left eye viewpoint into the left eye viewpoint image, and converts right eye adjacent viewpoint images provided to viewpoints adjacent to the right eye viewpoint into the right eye viewpoint image.

The viewpoint separation unit includes a parallax barrier or a lenticular lens.

The display device may further include an eye tracking unit configured to detect the left eye position and the right eye position of the viewer.

The left eye adjacent viewpoint images overlap the left eye viewpoint image, and the right eye adjacent viewpoint images overlap the right eye viewpoint image.

The control unit turns off the sub-pixels mapped to at least one of the left eye adjacent viewpoint images and the sub-pixels mapped to at least one of the right eye adjacent viewpoint images.

A crosstalk value of the at least one left eye adjacent viewpoint image and the at least one right eye adjacent viewpoint image is 5% or less.

The control unit reduces a brightness of at least one of the left eye adjacent viewpoint images converted into the left eye viewpoint image and a brightness of at least one of the right eye adjacent viewpoint images converted into the right eye viewpoint image.

According to an embodiment of the present disclosure, there is provided a display device including: a display panel including sub-pixels; a viewpoint separation unit configured to separate viewpoint images displayed by the display panel for each viewpoint; and a control unit configured to determine a left eye viewpoint image provided to a left eye viewpoint corresponding to a left eye position of a viewer and a right eye viewpoint image provided to a right eye viewpoint corresponding to a right eye position of the viewer, wherein the control unit reduces a brightness of left eye adjacent viewpoint images provided to viewpoints adjacent to the left eye viewpoint and a brightness of right eye adjacent viewpoint images provided to viewpoints adjacent to the right eye viewpoint.

The display device further includes an eye tracking unit configured to detect the left eye position and the right eye position of the viewer.

The control unit turns off the sub-pixels mapped to at least one of the left eye adjacent viewpoint images and the sub-pixels mapped to at least one of the right eye adjacent viewpoint images.

A crosstalk value of the at least one left eye adjacent viewpoint image and the at least one right eye adjacent viewpoint image is 5% or less.

According to an embodiment of the present disclosure, there is provided a method of driving a display device including a display panel including sub-pixels, the method including: separating viewpoint images displayed by the display panel for each viewpoint; detecting a left eye position and a right eye position of a viewer; determining a left eye viewpoint image provided to a left eye viewpoint corresponding to the left eye position and a right eye viewpoint image provided to a right eye viewpoint corresponding to the right eye position; and converting left eye adjacent viewpoint images provided to viewpoints adjacent to the left eye viewpoint into the left eye viewpoint image, and converting right eye adjacent viewpoint images provided to viewpoints adjacent to the right eye viewpoint into the right eye viewpoint image.

The viewpoint images are separated for each viewpoint by a parallax barrier or a lenticular lens.

The left eye adjacent viewpoint images overlap the left eye viewpoint image, and the right eye adjacent viewpoint images overlap the right eye viewpoint image.

The method further including turning off the sub-pixels mapped to at least one of the left eye adjacent viewpoint images and the sub-pixels mapped to at least one of the right eye adjacent viewpoint images.

A crosstalk value of the at least one left eye adjacent viewpoint image and the at least one right eye adjacent viewpoint image is 5% or less.

The method further including reducing a brightness of at least one of the left eye adjacent viewpoint images converted into the left eye viewpoint image and a brightness of at least one of the right eye adjacent viewpoint images converted into the right eye viewpoint image.

According to an embodiment of the present disclosure, there is provided a method of driving a display device including a display panel including sub-pixels, the method including: separating viewpoint images displayed by the display panel for each viewpoint; detecting a left eye position and a right eye position of a viewer; determining a left eye viewpoint image provided to a left eye viewpoint corresponding to the left eye position and a right eye viewpoint image provided to a right eye viewpoint corresponding to the right eye position; and reducing a brightness of left eye adjacent viewpoint images provided to viewpoints adjacent to the left eye viewpoint and a brightness of right eye adjacent viewpoint images provided to viewpoints adjacent to the right eye viewpoint.

The method further including turning off the sub-pixels mapped to at least one of the left eye adjacent viewpoint images and the sub-pixels mapped to at least one of the right eye adjacent viewpoint images.

A crosstalk value of the at least one left eye adjacent viewpoint image and the at least one right eye adjacent viewpoint image is 5% or less.

In accordance with the display device and the method of driving the same according to embodiments of the present disclosure, crosstalk may be reduced and thus a 3D image having improved quality may be displayed.

BRIEF DESCRIPTION OF THE DRAWINGS

The above and other features of the present disclosure will become more apparent by describing in further detail embodiments thereof with reference to the accompanying drawings, in which.

DETAILED DESCRIPTION OF THE EMBODIMENTS

The present disclosure will now be described more fully hereinafter with reference to the accompanying drawings, in which various embodiments are shown. This disclosure may, however, be embodied in many different forms, and should not be construed as limited to the embodiments set forth herein.

In the drawings, like reference numerals may designate like elements. In the drawings, the dimensions of the structures illustrated therein are enlarged to better highlight the present disclosure. It will be understood that, although the terms "first", "second", etc. may be used herein to describe various elements, these elements should not be limited by these terms. These terms are used to distinguish one element from another element. For instance, a first element discussed below could be termed a second element. Similarly, the second element could also be termed the first element.

The terminology used herein is for the purpose of describing particular embodiments and is not intended to be limiting. As used herein, "a", "an," "the," and "at least one" do not denote a limitation of quantity, and are intended to include both the singular and plural, unless the context clearly indicates otherwise. As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In the following description, when a first part is "connected" to a second part, this includes not only the case where the first part is directly connected to the second part, but also the case where a third part is interposed therebetween and they are connected to each other.

Furthermore, relative terms, such as "lower" or "bottom" and "upper" or "top," may be used herein to describe one element's relationship to another element as illustrated in the drawings. It will be understood that relative terms are intended to encompass different orientations of the device in addition to the orientation depicted in the drawings. For example, if the device in one of the drawings is turned over, elements described as being on the "lower" side of other elements would then be oriented on "upper" sides of the other elements. The term "lower," can therefore, encompasses both an orientation of "lower" and "upper," depending on the particular orientation of the drawing. Similarly, if the device in one of the drawings is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
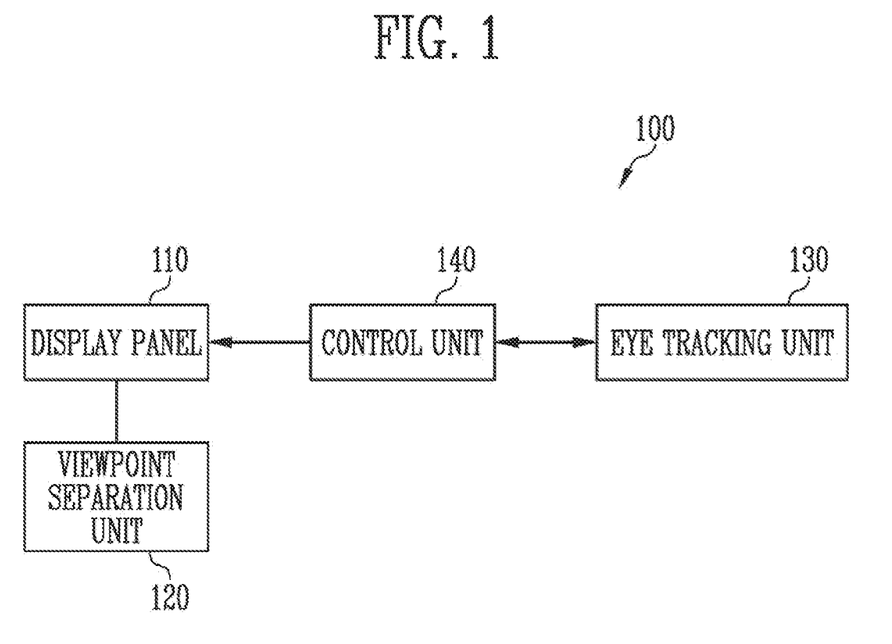
FIG. 1 is a diagram illustrating a display device according to an embodiment.
Figure 2:
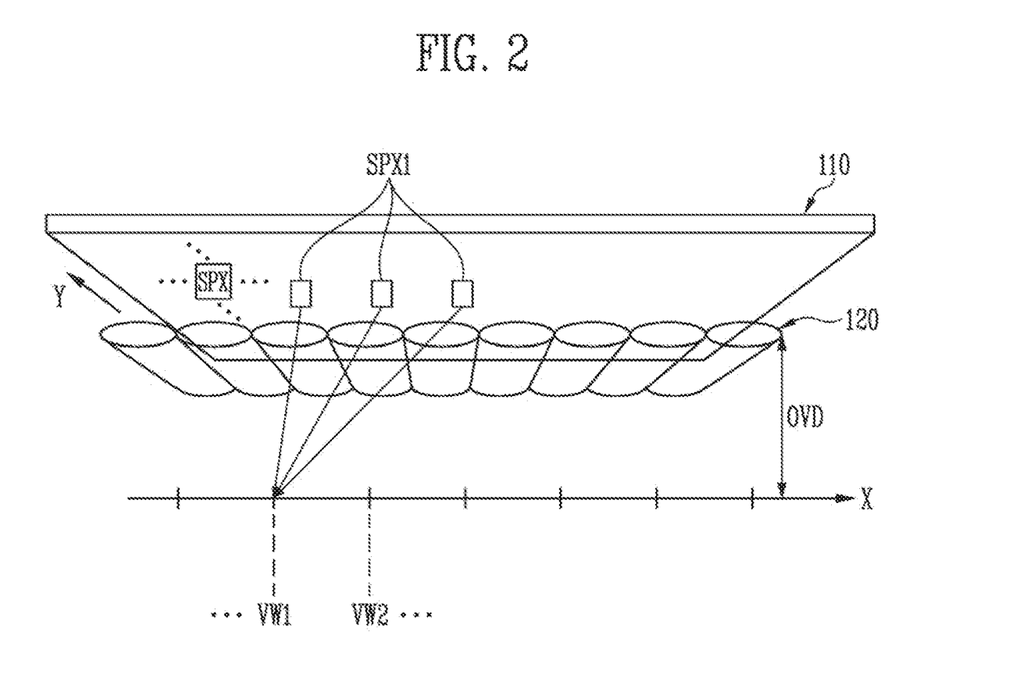
FIG. 2 is a schematic side perspective view of a display device according to an embodiment.
Figure 3:
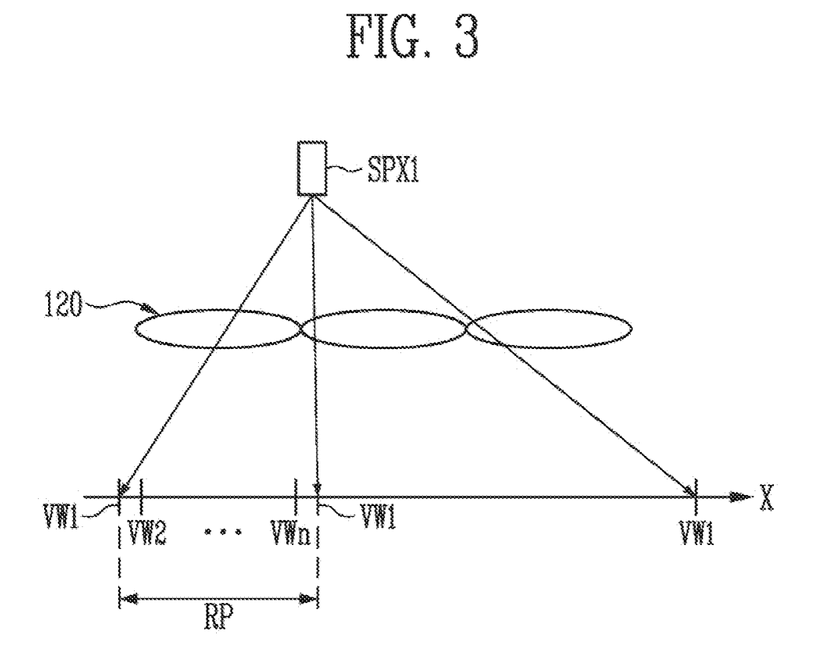
FIG. 3 is a diagram illustrating a viewpoint by a viewpoint separation unit according to an embodiment.

FIG. 1 is a diagram illustrating a display device 100 according to an embodiment. FIG. 2 is a schematic side perspective view of the display device 100 according to an embodiment. FIG. 3 is a diagram illustrating a viewpoint by a viewpoint separation unit 120 according to an embodiment.

Referring to FIGS. 1 to 3, the display device 100 may include a display panel 110, the viewpoint separation unit 120, an eye tracking unit 130, and a control unit 140.

The display device 100 may provide a three-dimensional (3D) image to a viewer. The display device 100 may be a stereoscopic image display device that converts an input image into a 3D image that is a stereoscopic image and outputs the 3D image. For example, the display device 100 may implement the stereoscopic image by forming a light field expressed with an intensity and a direction of light reflected from a 3D object in a 3D space.

The display device 100 may output the 3D image in an autostereoscopic manner. For example, the display device 100 may be implemented in various forms such as a 3D television (TV), a wearable device, a 3D heads-up display (HUD), a monitor, a tablet computer, a smartphone, a mobile device, a smart home appliance, or the like.

The display panel 110 may include sub-pixels SPX that emit light to display an image. Each sub-pixel SPX may output one of light of a first color, light of a second color, and light of a third color. For example, the first color may be red, the second color may be green, and the third color may be blue. However, a color of light emitted from each sub-pixel SPX is not limited thereto, and light of various colors may be output to implement full-color.

The sub-pixels SPX may be arranged in a matrix form configured in a plurality of row and column directions. Referring to FIG. 2, a row direction may be indicated as an x-axis direction, and a column direction may be indicated as a y-axis direction. Each sub-pixel SPX may include a switching element such as a thin film transistor connected to a signal line and a pixel electrode connected to the switching element. Here, the signal line may include scan lines for transferring a scan signal and data lines for transferring a data signal (or a data voltage).

The display panel 100 may display viewpoint images using the sub-pixels SPX. The viewpoint images may refer to images obtained by capturing the same 3D object from different angles. The viewpoint images are used to create a stereoscopic or 3D effect when displayed to the viewer. The sub-pixels SPX may configure the viewpoint images through respective color information.

The display panel 100 may include an organic light emitting display panel, a liquid crystal display panel, a quantum dot display panel, and the like.

The viewpoint separation unit 120 may separate the viewpoint images displayed by the display panel 100 for each viewpoint. Referring to FIG. 2, the viewpoint separation unit 120 may divide the viewpoint images displayed by each of the sub-pixels SPX of the display panel 100 and transmit the viewpoint images to viewpoints VW1, VW2, . . . corresponding to each of the sub-pixels SPX.

A distance from the display device 100 where an optimal stereoscopic image can be observed is referred to as an optimal viewing distance (hereinafter referred to as OVD). The position along the x-axis direction where the viewpoint images from each of the sub-pixels SPX converge at the OVD may be referred to as a viewpoint. For example, when a viewpoint image displayed by first sub-pixels SPX1 is observed is a first viewpoint VW1, light of the viewpoint image displayed by the first sub-pixels SPX1 may reach the first viewpoint VW1 through the viewpoint separation unit 120.

Referring to FIG. 3, each of the viewpoint images displayed by the display panel 110 may reach any one viewpoint of a unit view area (hereinafter referred to as RP) having a certain viewing angle through the viewpoint separation unit 120. In other words, each viewpoint image displayed by the display panel 110 can reach a specific viewpoint within the RP via the viewpoint separation unit 120. For example, the viewpoints VW1 to VWn (where n is a natural number equal to or greater than 2) can be located within a single RP. The corresponding viewpoints for each of the sub-pixels SPX are determined based on the position where light lands within that RP. The RP may be periodically repeated on the OVD, and an order of viewpoints VW1 to VWn may be constant within each RP.

As described above, the viewpoint separation unit 120 may control a direction of light so that the light output from each sub-pixel SPX proceeds only to a specific viewpoint (or direction) and converges on a position of the eyes of a viewer. Accordingly, different viewpoint images may be provided to a left eye and a right eye of the viewer, and the viewer may view the stereoscopic image through such binocular parallax.

The viewpoint separation unit 120 may include a lenticular lens or a parallax barrier. Referring to FIGS. 2 and 3, the viewpoint separation unit 120 may include a lenticular lens including lens areas. The lenticular lens may refract the viewpoint images displayed by the display panel 110 through the lens areas. Each of the lens areas may be formed to have a size corresponding to at least one sub-pixel SPX, and may separate the light emitted from each sub-pixel SPX for each viewpoint. When the viewpoint separation unit 120 includes the lenticular lens, the viewpoint separation unit 120 may be disposed on a front surface of the display panel 110.

For convenience of description, in FIGS. 2 and 3, the viewpoint separation unit 120 is shown as including the lenticular lens. However, the viewpoint separation unit 120 may include the parallax barrier, and the parallax barrier may include a transparent slit array including barrier areas. The parallax barrier may block light through a slit between the barrier areas to separate the light emitted from each sub-pixel SPX for each viewpoint. When the viewpoint separation unit 120 includes the parallax barrier, the viewpoint separation unit 120 may be disposed on the front surface or a rear surface of the display panel 110.

The eye tracking unit 130 may detect a left eye position and a right eye position of the viewer and provide a result thereof to the control unit 140. The left eye position may be a center position of a left pupil of the viewer, and the right eye position may be a center position of a right pupil of the viewer. To accomplish this, the eye tracking unit 130 may include an imaging unit and a detection unit.

The imaging unit may be disposed in an outer area of the display device 100. For example, the imaging unit may be disposed in a bezel area at an upper end center, a left end center, or a right end center of the display device 100, but is not limited thereto.

The imaging unit may capture an image of the viewer. The imaging unit may include a lens module including a lens and an image sensor. A shape input through the lens may be input as an optical signal to the image sensor serving as a film, and the image sensor may convert the input optical signal into an electrical signal and transmit the electrical signal to the detection unit. For example, the imaging unit may be implemented as a stereo camera, a depth camera, or the like capable of detecting a viewing distance of the viewer.

The detection unit may detect a face position of the viewer from the captured image received from the imaging unit, and may detect the left eye position and the right eye position of the viewer based on the detected face position. For example, the detection unit may detect the left eye position and the right eye position of the viewer by tracking a movement position of the viewer based on the face position of the viewer detected in a previous frame and a current frame.

In addition, the detection unit may detect the viewing distance of the viewer from the captured image received from the imaging unit. For example, when the imaging unit is implemented as the depth camera, the viewing distance may be automatically detected from an image captured by the camera. However, the disclosure is not limited thereto, and the viewing distance may be directly set by the viewer.

For example, the viewer may set the viewing distance by using an on screen display (OSD) menu capable of selecting the viewing distance, which is provided by the display device 100, a button provided for each viewing distance on a remote controller, and the like, and the viewing distance that may be set may be in a range of 0.5 to 1.5 times the OVD.

The control unit 140 may convert 3D data into viewpoint images based on the left eye position and the right eye position of the viewer provided by the eye tracking unit 130. The 3D data may include coordinate information and depth information of the 3D object. The 3D data may be provided from a memory included in the display device 100 or an external device. To perform the above-described operation, the control unit 140 may include an application processor (AP), a central processing unit (CPU), or a microprocessor.

The control unit 140 may map the viewpoint images to the sub-pixels SPX. For example, referring to FIG. 2, the control unit 140 may map the viewpoint image corresponding to the first viewpoint VW1 to the first sub-pixel SPX. In such a method, the control unit 140 may map the viewpoint images corresponding to each of the viewpoints VW1 to VWn to the sub-pixels SPX.

Figure 4:
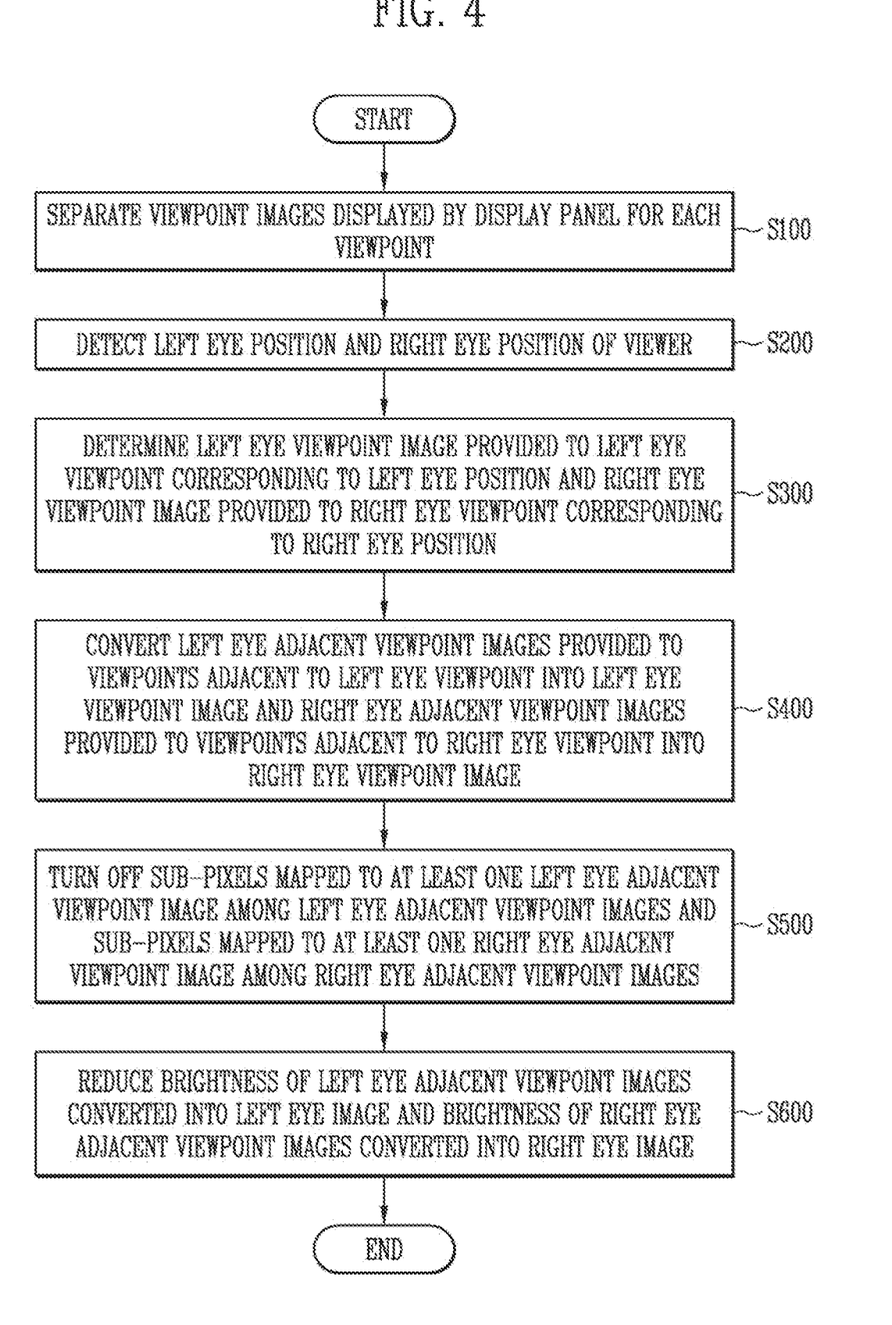
FIG. 4 is a diagram illustrating a method of driving a display device according to an embodiment.
Figure 5:
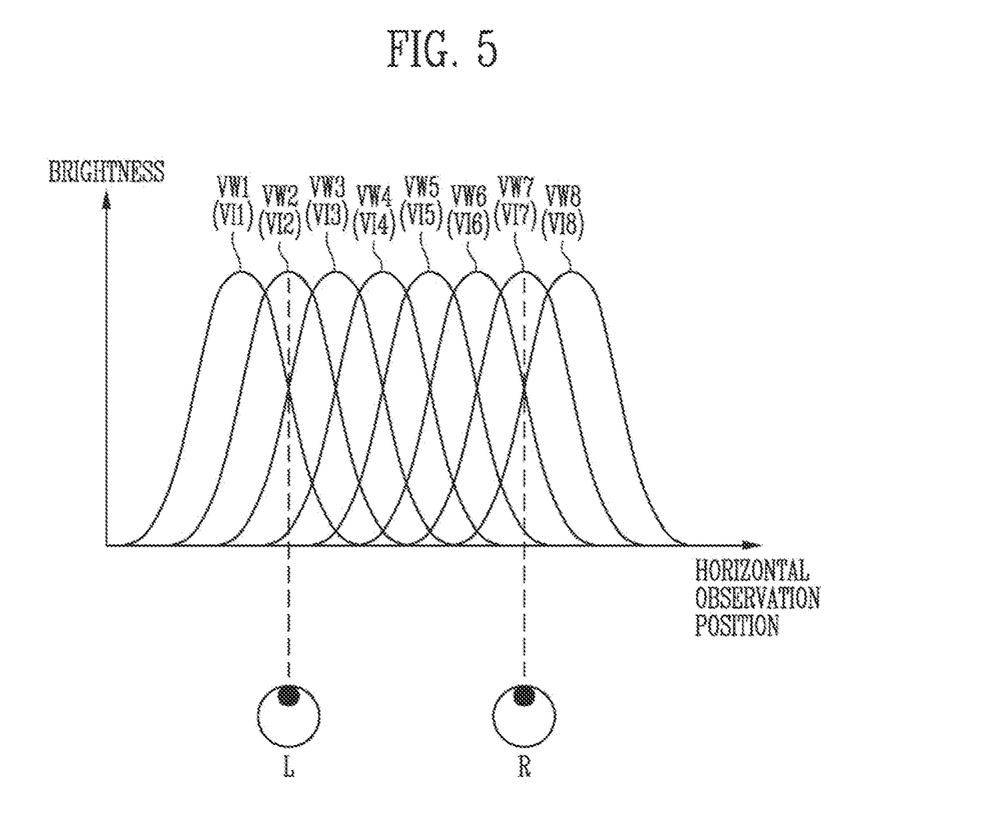
FIG. 5 is a diagram illustrating brightness of a viewpoint image according to a viewing position of a viewer.
Figure 6:
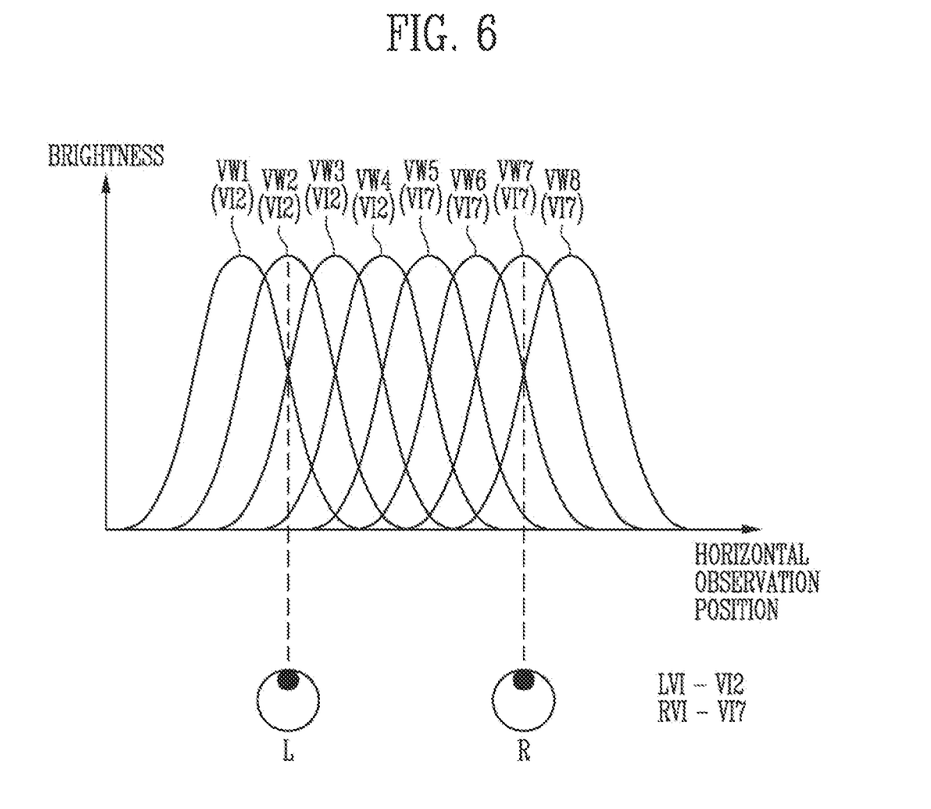
FIG. 6 is a diagram illustrating an operation of an eye tracking unit and a control unit according to an embodiment.
Figure 7:
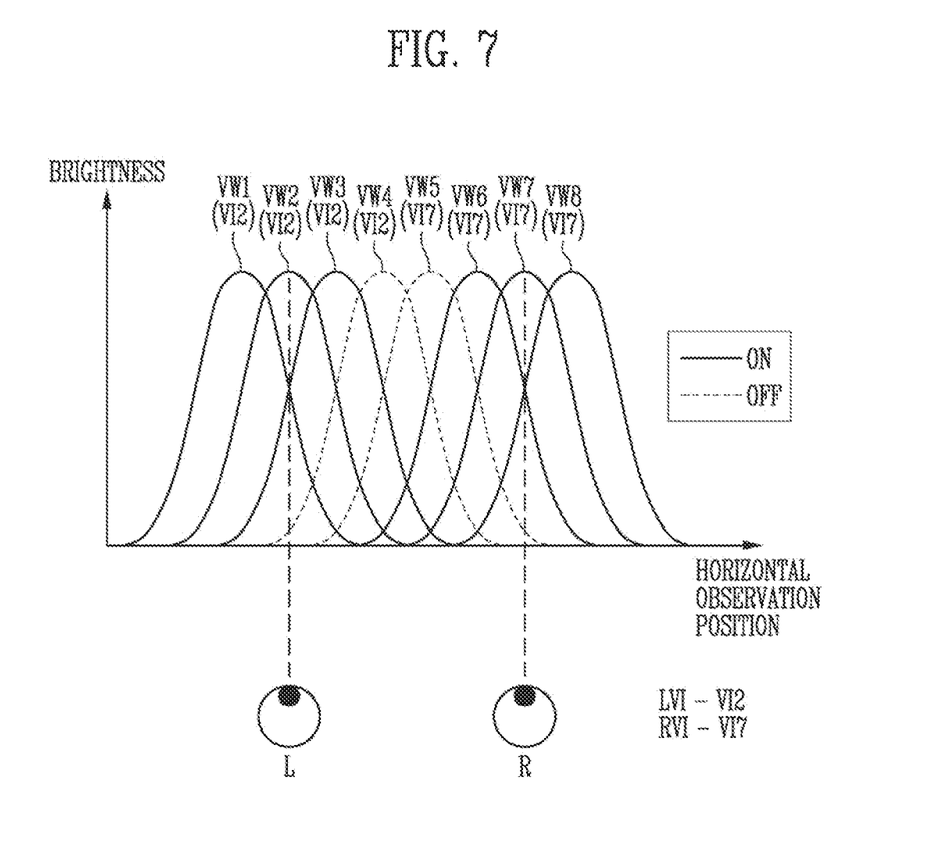
FIG. 7 is a diagram illustrating an operation of a control unit according to an embodiment.
Figure 8:
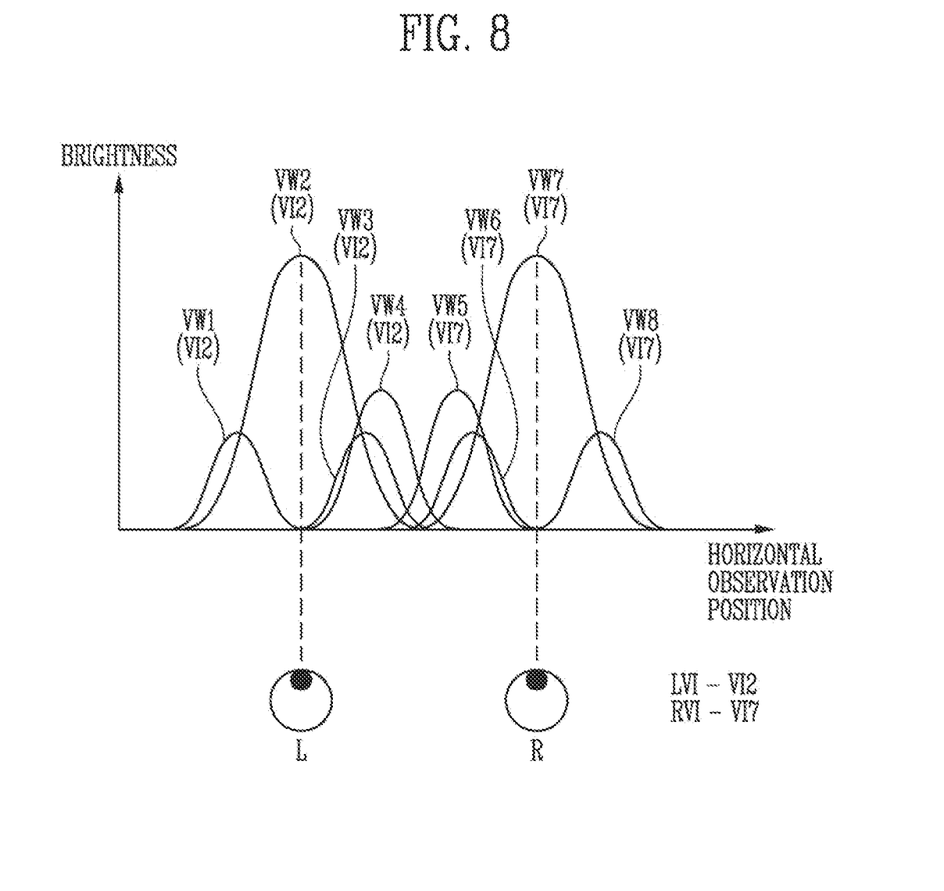
FIG. 8 is a diagram illustrating an operation of a control unit according to an embodiment.

FIG. 4 is a diagram illustrating a method of driving a display device according to an embodiment. FIG. 5 is a diagram illustrating brightness of a viewpoint image according to a viewing position of the viewer. In FIG. 5, an x-axis represents the viewing position (in other words, a horizontal observation position), and a y-axis represents the brightness of the viewpoint image. FIG. 6 is a diagram illustrating an operation of the eye tracking unit 130 and the control unit 140 according to an embodiment. FIG. 7 is a diagram illustrating an operation of the control unit 140 according to an embodiment. FIG. 8 is a diagram illustrating an operation of the control unit 140 according to an embodiment.

Referring to FIG. 4, the method of driving the display device may include separating viewpoint images displayed by a display panel for each viewpoint (S100), detecting a left eye position and a right eye position of a viewer (S200), determining a left eye viewpoint image provided to a left eye viewpoint corresponding to the left eye position and a right eye viewpoint image provided to a right eye viewpoint corresponding to the right eye position (S300), and converting left eye adjacent viewpoint images provided to viewpoints adjacent to the left eye viewpoint into the left eye viewpoint image, and converting right eye adjacent viewpoint images provided to viewpoints adjacent to the right eye viewpoint into the right eye viewpoint image (S400).

According to an embodiment, the method of driving the display device may further include turning off sub-pixels mapped to at least one left eye adjacent viewpoint image among the left eye adjacent viewpoint images and sub-pixels mapped to at least one right eye adjacent viewpoint image among the right eye adjacent viewpoint images (S500).

According to an embodiment, the method of driving the display device may further include reducing brightness of the left eye adjacent viewpoint images converted into the left eye viewpoint image and brightness of the right eye adjacent viewpoint images converted into the right eye viewpoint image (S600).

Steps S500 and S600 may be selectively performed. In other words, steps S500 and S600 may be omitted if necessary. For example, when step S500 is omitted and step S600 is performed, step S600 may be performed after step S400.

Hereinafter, for convenience of description, it is assumed that a brightness distribution for each viewing position for viewpoint images VI1, VI2, VI3, VI4, VI5, VI6, VI7 and VI8 respectively corresponding to eight viewpoints VW1, VW2, VW3, VW4, VW5, VW6, VW7 and VW8 is shown. However, the disclosure is not limited thereto, and the brightness distribution for each viewing position for the viewpoint images may be varied in correspondence with the number of viewpoints and a viewpoint interval.

Referring to FIGS. 1, 4, and 5, in step S100, the viewpoint separation unit 120 may separate the viewpoint images displayed by the display panel 110 for each viewpoint. For example, the viewpoint separation unit 120 may separate the eight viewpoint images VI1 to VI8 displayed by the display panel 110 and send the eight viewpoint images VI1 to VI8 to the respectively corresponding viewpoints VW1 to VW8.

As shown in FIG. 5, brightness of one viewpoint image may decrease as a distance from a center increases, and thus the one viewpoint image may affect another adjacent viewpoint image. For example, the brightness of one viewpoint image may overlap the brightness of an adjacent viewpoint image. Thus, crosstalk may occur when an image of a different viewpoint is provided at a certain position instead of the corresponding viewpoint image.

For example, when a left eye L of the viewer is at a position where the second viewpoint image VI2 which is the brightest image provided to the left eye L, not only the second viewpoint image VI2 corresponding to the second viewpoint VW2 but also the first viewpoint image VI1 corresponding to the first viewpoint VW1, the third viewpoint image VI3 corresponding to the third viewpoint VW3, and the fourth viewpoint image VI4 corresponding to the fourth viewpoint VW4 may be provided to the left eye L of the viewer, and thus crosstalk may occur.

In addition, when a right eye R of the viewer is at a position where the seventh viewpoint image VI7 which is the brightest image provided to the right eye R, not only the seventh viewpoint image VI7 corresponding to the seventh viewpoint VW7 but also the fifth viewpoint image VI5 corresponding to the fifth viewpoint VW5, the sixth viewpoint image VI6 corresponding to the sixth viewpoint VW6, and the eighth viewpoint image VI8 corresponding to the eighth viewpoint VW8 may be provided to the right eye R of the viewer, and thus crosstalk may occur. Accordingly, quality of a 3D image provided to the viewer may be reduced.

Referring to FIGS. 1, 4, and 6, in step S200, the eye tracking unit 130 may detect a left eye position corresponding to the left eye L of the viewer and a right eye position corresponding to the right eye R of the viewer, and provide a result thereof to the control unit 140.

In step S300, the control unit 140 may determine a left eye viewpoint image LVI provided to a viewpoint (or a left eye viewpoint) corresponding to the left eye position of the viewer and a right eye viewpoint image RVI provided to a viewpoint (or a right eye viewpoint) corresponding to the right eye position of the viewer, based on the left eye position and the right eye position of the viewer provided from the eye tracking unit 130.

For example, as shown in FIG. 6, the control unit 140 may determine the second viewpoint image VI2 provided to the second viewpoint VW2 corresponding to the left eye position of the viewer as the left eye viewpoint image LVI. In addition, the control unit 140 may determine the seventh viewpoint image VI7 provided to the seventh viewpoint VW7 corresponding to the right eye position of the viewer as the right eye viewpoint image RVI.

In step S400, the control unit 140 may convert left eye adjacent viewpoint images provided to viewpoints adjacent to the left eye viewpoint into the left eye viewpoint image LVI and convert right eye adjacent viewpoint images provided to viewpoints adjacent to the right eye viewpoint into the right eye viewpoint image RVI.

The left eye adjacent viewpoint images may be viewpoint images different from the left eye viewpoint image LVI, and may be a viewpoint image that generates crosstalk at the left eye position of the viewer. In other words, the left eye adjacent viewpoint images may be viewpoint images overlapping the left eye viewpoint image LVI and provided to the left eye viewpoint.

In addition, the right eye adjacent viewpoint images may be viewpoint images different from the right eye viewpoint image RVI, and may be a viewpoint image that generates crosstalk at the right eye position of the viewer. In other words, the right eye adjacent viewpoint images may be viewpoint images overlapping the right eye viewpoint image RVI and provided to the right eye viewpoint.

The control unit 140 may convert the left eye adjacent viewpoint images into the left eye viewpoint image LVI, and map the left eye viewpoint image LVI to each of the sub-pixels SPX (refer to FIG. 2) corresponding to the left eye adjacent viewpoint images.

The control unit 140 may convert the right eye adjacent viewpoint images into the right eye viewpoint image RVI, and map the right eye viewpoint image RVI to each of the sub-pixels SPX (refer to FIG. 2) corresponding to the right eye adjacent viewpoint images. In other words, in step S400, the control unit 140 may perform a series of operations of rearranging the viewpoint image in a unit of the sub-pixel SPX.

Due to the operation of the control unit 140 described above, only the left eye viewpoint image LVI corresponding to the left eye viewpoint may be provided to the left eye L of the viewer, and only the right eye viewpoint image RVI corresponding to the right eye viewpoint may be provided to the right eye R of the viewer, thereby reducing crosstalk.

For example, the control unit 140 may convert the first viewpoint image VI1, the third viewpoint image VI3, and the fourth viewpoint image VI4 respectively provided to the first viewpoint VW1, the third viewpoint VW3, and the fourth viewpoint VW4 adjacent to the second viewpoint VW2 corresponding to the left eye viewpoint of the viewer into the second viewpoint image VI2 corresponding to the left eye viewpoint image LVI.

In addition, the control unit 140 may convert the fifth viewpoint image VI5, the sixth viewpoint image VI6, and the eighth viewpoint image VI8 respectively provided to the fifth viewpoint VW5, the sixth viewpoint VW6, and the eighth viewpoint VW8 adjacent to the seventh viewpoint VW7 corresponding to the right eye viewpoint of the viewer into the seventh viewpoint image VI7 corresponding to the right eye viewpoint image RVI.

Accordingly, only the second viewpoint image VI2 corresponding to the second viewpoint VW2 may be provided to the left eye L of the viewer, and only the seventh viewpoint image VI7 corresponding to the seventh viewpoint VW7 may be provided to the right eye R of the viewer, thereby reducing crosstalk.

Referring to FIGS. 1, 4, and 7, in step S500, the control unit 140 may turn off the sub-pixels SPX (refer to FIG. 2) mapped to at least one left eye adjacent viewpoint image among the left eye adjacent viewpoint images. In other words, the control unit 140 may remove at least one left eye adjacent viewpoint image among the left eye adjacent viewpoint images so that a corresponding viewpoint image is not provided to at least one of viewpoints adjacent to the left eye viewpoint.

In addition, in step S500, the control unit 140 may turn off the sub-pixels SPX (refer to FIG. 2) mapped to at least one right eye adjacent viewpoint image among the right eye adjacent viewpoint images. In other words, the control unit 140 may remove at least one right eye adjacent viewpoint image among the right eye adjacent viewpoint images so that a corresponding viewpoint image is not provided to at least one of viewpoints adjacent to the right eye viewpoint.

In an embodiment, a crosstalk value of at least one left eye adjacent viewpoint image and at least one right eye adjacent viewpoint image removed by the control unit 140 may be 5% or less. Experimentally, when the crosstalk value of at least one left eye adjacent viewpoint image and at least one right eye adjacent viewpoint image is 5% or less, a quality degradation of the 3D image perceived by the viewer is insignificant. Therefore, the control unit 140 may reduce power consumption by removing at least one left eye adjacent viewpoint image and at least one right eye adjacent viewpoint image having a relatively small effect on the quality degradation of the 3D image.

For example, the control unit 140 may remove the left eye adjacent viewpoint image VI2 provided to the fourth viewpoint VW4 having a relatively small crosstalk among the first viewpoint VW1, the third viewpoint VW3, and the fourth viewpoint VW4 adjacent to the second viewpoint VW2 corresponding to the left eye viewpoint of the viewer. In other words, the control unit 140 may turn off the sub-pixels SPX mapped to the left eye adjacent viewpoint image VI2 provided to the fourth viewpoint VW4.

In addition, the control unit 140 may remove the right eye adjacent viewpoint image VI7 provided to the fifth viewpoint VW5 having a relatively small crosstalk among the fifth viewpoint VW5, the sixth viewpoint VW6, and the eighth viewpoint VW8 adjacent to the seventh viewpoint VW7 corresponding to the right eye viewpoint of the viewer. In other words, the control unit 140 may turn off the sub-pixels SPX mapped to the right eye adjacent viewpoint image VI7 provided to the fifth viewpoint VW5.

Referring to FIGS. 1, 4, and 8, in step S600, the control unit 140 may reduce brightness of the left eye adjacent viewpoint images converted into the left eye viewpoint image LVI and brightness of the right eye adjacent viewpoint images converted into the right eye viewpoint image RVI. In other words, the control unit 140 may reduce crosstalk and power consumption by additionally reducing the brightness of the left eye adjacent viewpoint images and the right eye adjacent viewpoint images.

For example, the control unit 140 may reduce brightness of the left eye adjacent viewpoint images converted into the second viewpoint image VI2 corresponding to the left eye viewpoint image LVI. More specifically, the control unit 140 may reduce the brightness of the viewpoint images provided to the first viewpoint VW1, the third viewpoint VW3, and the fourth viewpoint VW4.

In addition, the control unit 140 may reduce brightness of the right eye adjacent viewpoint images converted into the seventh viewpoint image VI7 corresponding to the right eye viewpoint image RVI. More specifically, the control unit 140 may reduce the brightness of the viewpoint images provided to the fifth viewpoint VW5, the sixth viewpoint VW6, and the eighth viewpoint VW8. Accordingly, crosstalk may be further reduced, and power consumption may be additionally reduced.

Figure 9:
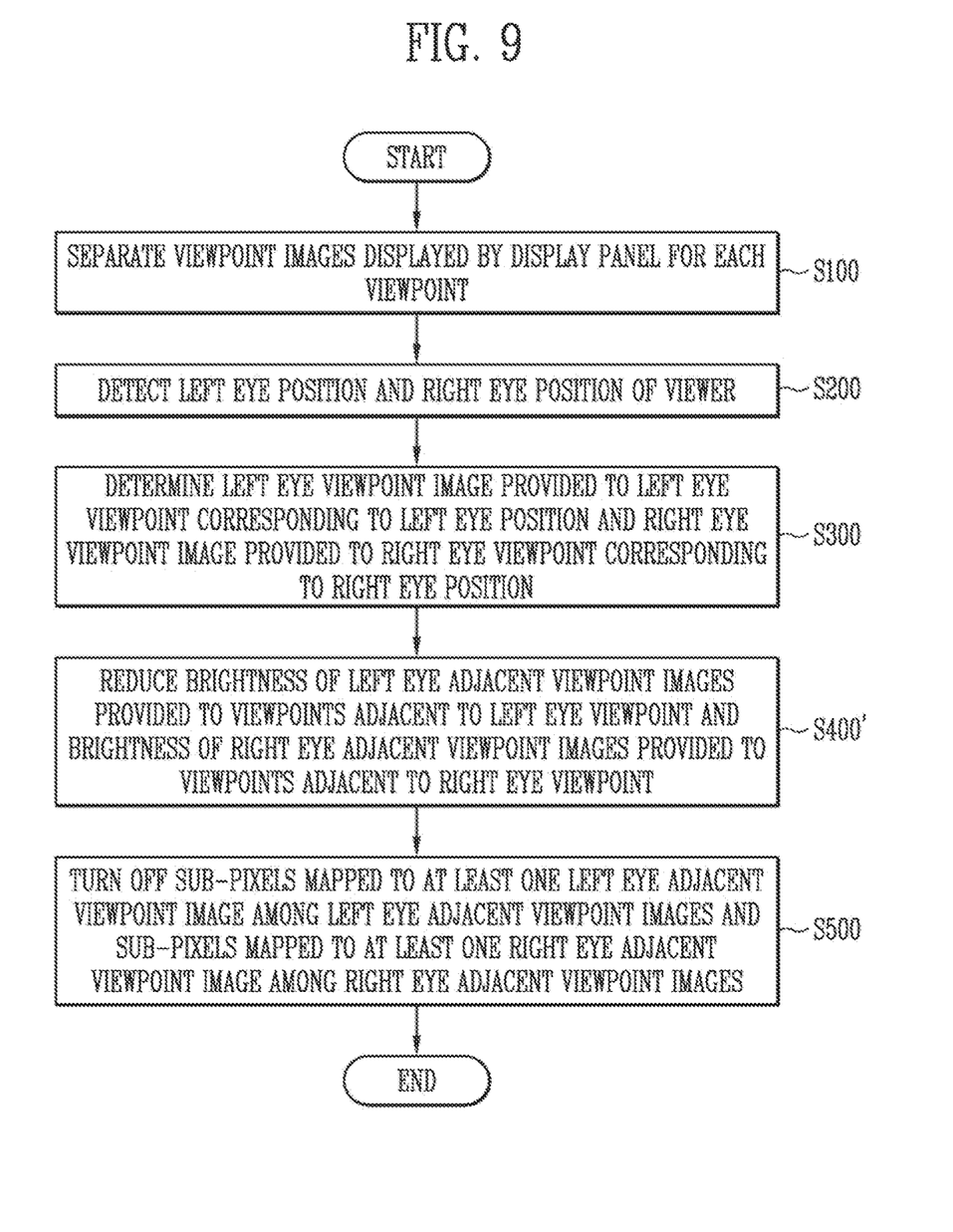
FIG. 9 is a diagram illustrating a method of driving a display device according to an embodiment.
Figure 10:
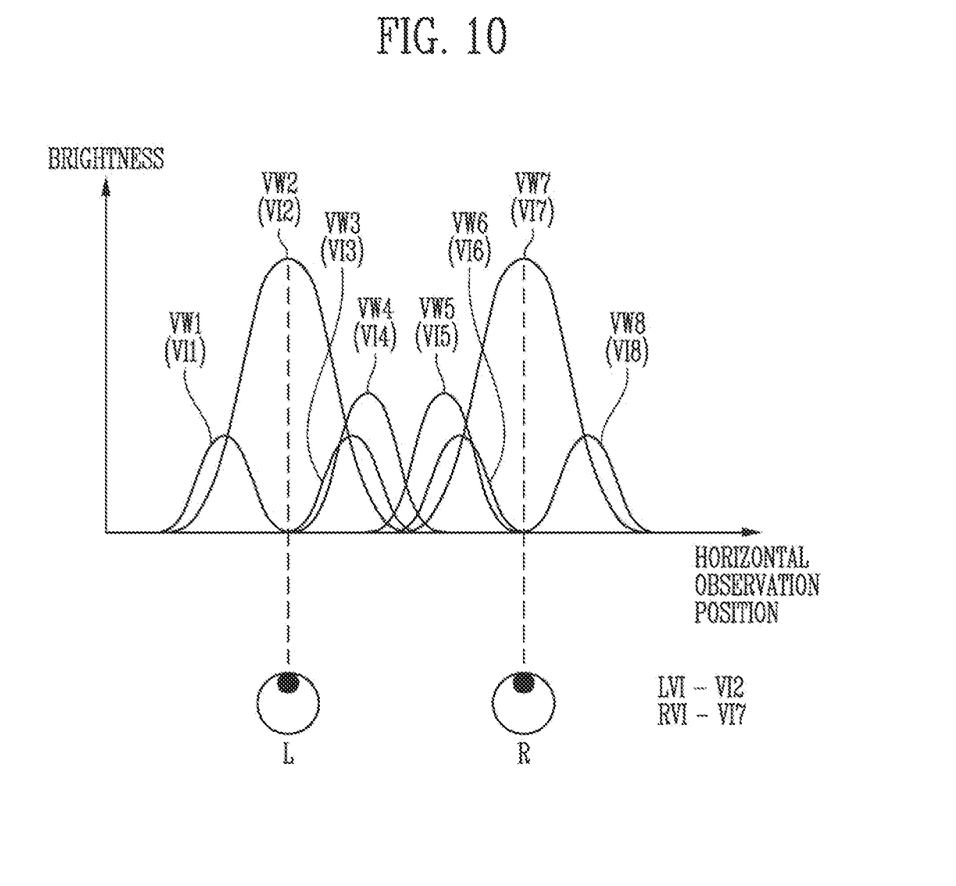
FIG. 10 is a diagram illustrating an operation of a control unit according to an embodiment.

FIG. 9 is a diagram illustrating a method of driving a display device according to an embodiment. FIG. 10 is a diagram illustrating an operation of the control unit 140 according to an embodiment. In relation to FIGS. 9 and 10, a description of contents overlapping those described above is simplified or omitted.

Referring to FIG. 9, the method of driving the display device may include separating viewpoint images displayed by a display panel for each viewpoint (S100), detecting a left eye position and a right eye position of a viewer (S200), determining a left eye viewpoint image provided to a left eye viewpoint corresponding to the left eye position and a right eye viewpoint image provided to a right eye viewpoint corresponding to the right eye position (S300), and reducing brightness of left eye adjacent viewpoint images provided to viewpoints adjacent to the left eye viewpoint and brightness of right eye adjacent viewpoint images provided to viewpoints adjacent to the right eye viewpoint (S400').

According to an embodiment, the method of driving the display device may further include turning off sub-pixels mapped to at least one left eye adjacent viewpoint image among the left eye adjacent viewpoint images and sub-pixels mapped to at least one right eye adjacent viewpoint image among the right eye adjacent viewpoint images (S500).

Referring to FIGS. 1, 9, and 10, in step S400', the control unit 140 may reduce the brightness of the left eye adjacent viewpoint images provided to the viewpoints adjacent to the left eye viewpoint and the brightness of the right eye adjacent viewpoint images provided to the viewpoints adjacent to the right eye viewpoint. Differently from FIG. 6, the control unit 140 may not convert the left eye adjacent viewpoint images into the left eye viewpoint image LVI and may not convert the right eye adjacent viewpoint images into the right eye viewpoint image RVI. In other words, the control unit 140 may reduce crosstalk and reduce power consumption by reducing the brightness of the left eye adjacent viewpoint images and the right eye adjacent viewpoint images.

For example, the control unit 140 may reduce brightness of the left eye adjacent viewpoint images provided to the first viewpoint VW1, the third viewpoint VW3, and the fourth viewpoint VW4 adjacent to the second viewpoint VW2 corresponding to the left eye viewpoint of the viewer. In other words, the control unit 140 may reduce the brightness of the first viewpoint image VI1, the third viewpoint image VI3, and the fourth viewpoint image VI4.

In addition, the control unit 140 may reduce brightness of the right eye adjacent viewpoint images provided to the fifth viewpoint VW5, the sixth viewpoint VW6, and the eighth viewpoint VW8 adjacent to the seventh viewpoint VW7 corresponding to the right eye viewpoint of the viewer. In other words, the control unit 140 may reduce the brightness of the fifth viewpoint image VI5, the sixth viewpoint image VI6, and the eighth viewpoint image VI8. Accordingly, crosstalk may be reduced and power consumption may be reduced without conversion of viewpoint images.

In FIG. 10, an embodiment in which the control unit 140 entirely reduces the brightness of the left eye adjacent viewpoint images and the right eye adjacent viewpoint images is shown. However, in an embodiment, step S500 may be further performed. At this time, in step S500, the control unit 140 may turn off the sub-pixels SPX (refer to FIG. 2) mapped to at least one left eye adjacent viewpoint image among the left eye adjacent viewpoint images, and may turn off the sub-pixels SPX (refer to FIG. 2) mapped to at least one right eye adjacent viewpoint image among the right eye adjacent viewpoint images.

Thus, as shown in FIG. 10, the control unit 140 may remove the left eye adjacent viewpoint image VI4 provided to the fourth viewpoint VW4 having a relatively small crosstalk value and the right eye adjacent viewpoint image VI5 provided to the fifth viewpoint VW5.

Although the disclosure has been specifically described with reference to the aforementioned embodiments, it should be noted that the above-described embodiments are merely descriptive and should not be considered limiting. It should be understood by those of ordinary skill in the art that various modifications are possible without departing from the scope of the disclosure as set forth by the following claims.

What is claimed is:

1. A display device comprising:
a display panel including sub-pixels;
a viewpoint separation unit configured to separate viewpoint images displayed by the display panel for a plurality of viewpoints; and
a control unit configured to:
detect a left eye position and a right eye position of a viewer;
determine a corresponding one of the plurality of viewpoints for each of the left and right eye positions;
generate a left eye image and a right eye image;
assign the left eye image and the right eye image to the corresponding viewpoints; and
in response to detecting that a viewpoint adjacent to a corresponding one of the plurality of viewpoints is viewable by the corresponding eye, assign the same left or right eye image to the adjacent viewpoint.

2. The display device according to claim 1, wherein the viewpoint separation unit includes a parallax barrier or a lenticular lens.

3. The display device according to claim 1, further comprising:
an eye tracking unit configured to detect the left eye position and the right eye position of the viewer.

4. The display device according to claim 1, wherein each adjacent viewpoint that is viewable by the left eye overlaps the corresponding viewpoint assigned the left eye image, and each adjacent viewpoint that is viewable by the right eye overlaps the corresponding viewpoint assigned the right eye image.

5. The display device according to claim 1, wherein the control unit turns off the sub-pixels mapped to at least one adjacent viewpoint that is viewable by the left eye and at least one adjacent viewpoint that is viewable by the right eye.

6. The display device according to claim 5, wherein a crosstalk value of the at least one left eye adjacent viewpoint that is viewable by the left eye and at least one adjacent viewpoint that is viewable by the right eye is 5% or less.

7. The display device according to claim 1, wherein the control unit reduces a brightness of at least one adjacent viewpoint that is viewable by the left eye and assigned the same left eye image, and at least one adjacent viewpoint that is viewable by the right eye and assigned the same right eye image.

8. A display device comprising:
a display panel including sub-pixels;
a viewpoint separation unit configured to separate viewpoint images displayed by the display panel for each of a plurality of viewpoints; and a control unit configured to:
  detect a left eye position and a right eye position of a viewer;
  determine a corresponding one of the plurality of viewpoints for each of the left and right eye positions;
  generate a left eye image and a right eye image;
  assign the left eye image and the right eye image to the corresponding viewpoints; and
  in response to detecting that a viewpoint adjacent to a corresponding one of the plurality of viewpoints is viewable by the corresponding eye based on the detected eye position, reduce a brightness of the image assigned to the adjacent viewpoint.

9. The display device according to claim 8, further comprising:
  an eye tracking unit configured to detect the left eye position and the right eye position of the viewer.

10. The display device according to claim 8, wherein the control unit turns off the sub-pixels mapped to at least one viewpoint adjacent to the corresponding one of the plurality of viewpoints for the left eye and at least one viewpoint adjacent to the corresponding one of the plurality of viewpoints for the right eye, in response to detecting that the adjacent viewpoint is viewable by the corresponding eye.

11. The display device according to claim 10, wherein a crosstalk value of at least one image assigned to a viewpoint adjacent to the corresponding viewpoint for the left eye and at least one image assigned to a viewpoint adjacent to the corresponding viewpoint for the right eye is 5% or less.

12. A method of driving a display device including a display panel including sub-pixels, the method comprising:
  separating viewpoint images displayed by the display panel for each of a plurality of viewpoints;
  detecting a left eye position and a right eye position of a viewer;
  determining a corresponding one of the plurality of viewpoints for each of the left eye position and the right eye position;
  generating a left eye image and a right eye image;
  assigning the left eye image and the right eye image to the corresponding viewpoints; and
  in response to detecting that a viewpoint adjacent to a corresponding one of the plurality of viewpoints is viewable by the corresponding eye based on the detected eye position, converting the image assigned to the adjacent viewpoint into the same image assigned to the corresponding viewpoint.

13. The method according to claim 12, wherein the viewpoint images are separated for each viewpoint by a parallax barrier or a lenticular lens.

14. The method according to claim 12, wherein each adjacent viewpoint that is viewable by the left eye overlaps the corresponding viewpoint assigned the left eye image, and each adjacent viewpoint that is viewable by the right eye overlaps the corresponding viewpoint assigned the right eye image.

15. The method according to claim 12, further comprising:
  turning off the sub-pixels mapped to at least one adjacent viewpoint that is viewable by the left eye and at least one adjacent viewpoint that is viewable by the right eye.

16. The method according to claim 15, wherein a crosstalk value of the at least one left eye adjacent viewpoint that is viewable by the left eye and at least one adjacent viewpoint that is viewable by the right eye is 5% or less.

17. The method according to claim 12, further comprising:
  reducing a brightness of at least one adjacent viewpoint that is viewable by the left eye and assigned the same left eye image, and at least one adjacent viewpoint that is viewable by the right eye and assigned the same right eye image.

18. A method of driving a display device including a display panel including sub-pixels, the method comprising:
  separating viewpoint images displayed by the display panel for each of a plurality of viewpoints;
  detecting a left eye position and a right eye position of a viewer;
  determining a corresponding one of the plurality of viewpoints for each of the left eye position and the right eye position;
  generating a left eye image and a right eye image;
  assigning the left eye image and the right eye image to the corresponding viewpoints; and
  in response to detecting that a viewpoint adjacent to a corresponding one of the plurality of viewpoints is viewable by the corresponding eye based on the detected eye position, reducing a brightness of an image assigned to the adjacent viewpoint.

19. The method according to claim 18, further comprising:
  turning off the sub-pixels mapped to at least one viewpoint adjacent to the corresponding one of the plurality of viewpoints for the left eye, and sub-pixels mapped to at least one viewpoint adjacent to the corresponding one of the plurality of viewpoints for the right eye, in response to detecting that the adjacent viewpoint is viewable by the corresponding eye.

20. The method according to claim 18, wherein a crosstalk value of at least one image assigned to a viewpoint adjacent to the corresponding viewpoint for the left eye and at least one image assigned to a viewpoint adjacent to the corresponding viewpoint for the right eye is 5% or less.

* * * * *